(12) United States Patent
VanTassel et al.

(10) Patent No.: US 11,728,588 B2
(45) Date of Patent: Aug. 15, 2023

(54) ELECTRICAL CONNECTOR FOR A CONTROL UNIT OF A VEHICLE BRAKE SYSTEM

(71) Applicant: ZF FRIEDRICHSHAFEN AG, Friedrichshafen (DE)

(72) Inventors: Ian VanTassel, Farmington Hills, MI (US); Paolo Rea, Livonia, MI (US)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 236 days.

(21) Appl. No.: 17/006,951

(22) Filed: Aug. 31, 2020

(65) Prior Publication Data
US 2022/0069503 A1    Mar. 3, 2022

(51) Int. Cl.
| | |
|---|---|
| *H01R 13/24* | (2006.01) |
| *H01R 13/629* | (2006.01) |
| *H01R 12/71* | (2011.01) |
| *H01R 13/41* | (2006.01) |
| *H01R 12/73* | (2011.01) |
| *B60T 7/04* | (2006.01) |

(52) U.S. Cl.
CPC ....... *H01R 13/2471* (2013.01); *H01R 12/714* (2013.01); *H01R 13/2421* (2013.01); *H01R 13/41* (2013.01); *H01R 13/62911* (2013.01); *B60T 7/042* (2013.01); *H01R 12/73* (2013.01); *H01R 13/2442* (2013.01); *H01R 2201/26* (2013.01)

(58) Field of Classification Search
CPC .. H01R 12/714; H01R 12/73; H01R 13/2471; H01R 2201/26; H01R 13/2421; H01R 4/02; H01R 12/52; H01R 12/7076
See application file for complete search history.

(56) References Cited

U.S. PATENT DOCUMENTS

| | | | | |
|---|---|---|---|---|
| 6,976,851 B2* | 12/2005 | Huang | ............... | H01R 13/2442 439/66 |
| 7,186,152 B2* | 3/2007 | Chen | ................. | H01R 13/2442 439/943 |
| 7,708,608 B2* | 5/2010 | Soh | ....................... | H01R 43/20 439/862 |
| 9,566,964 B2* | 2/2017 | Jürgens | ................. | B60T 8/4086 |
| 10,594,080 B2* | 3/2020 | Sugiki | .................... | H01R 12/91 |
| 10,862,234 B2* | 12/2020 | Horino | ................... | H01R 13/04 |

FOREIGN PATENT DOCUMENTS

DE    102012216051 A1 * 12/2013 ............. B60T 17/02

* cited by examiner

*Primary Examiner* — Briggitte R. Hammond
(74) *Attorney, Agent, or Firm* — Tarolli, Sundheim, Covell & Tummino L.L.P

(57) ABSTRACT

An electrical connector is adapted to be retained in a non-conducting housing and electrically connecting a first component to a second component spaced from one another. The connector includes a first end having a first contact portion for electrically communicating with the first component. A second end of the connector has a second contact portion for electrically communicating with the second component. The second end has a cantilevered beam adapted to flex at a knee portion to bias the second contact portion against an electrical contact surface of the second component. An attachment portion is disposed between the first and second ends. The attachment portion includes an engagement portion providing an interference fit with a mating groove of the housing in which the connector is retained.

13 Claims, 5 Drawing Sheets

ELECTRICAL CONNECTOR FOR A CONTROL UNIT OF A VEHICLE BRAKE SYSTEM

BACKGROUND OF THE INVENTION

This invention relates in general to electrical connectors. In particular, this invention relates to electrical connectors ideally suited for use in vehicle brake system control units. The connectors provide for an electrical connection between a first circuit board, which holds components of an electronic control unit (ECU), and a second circuit board, which houses electrical components such as sensors. The electrical connection may be for electrical power and/or data transmission.

Vehicles are commonly slowed and stopped with hydraulic brake systems. These systems vary in complexity but a base brake system typically includes a brake pedal, a tandem master cylinder, fluid conduits arranged in two similar but separate brake circuits, and wheel brakes in each circuit. The driver of the vehicle operates a brake pedal which is connected to the master cylinder. When the brake pedal is depressed, the master cylinder generates hydraulic forces in both brake circuits by pressurizing brake fluid. The pressurized fluid travels through the fluid conduit in both circuits to actuate brake cylinders at the wheels to slow the vehicle.

Braking a vehicle in a controlled manner under adverse conditions requires precise application of the brakes by the driver. Under these conditions, a driver can easily apply excessive braking pressure thus causing one or more wheels to lock, resulting in excessive slippage between the wheel and road surface. Such wheel lock-up conditions can lead to greater stopping distances and possible loss of directional control. Advances in braking technology have led to the introduction of Anti-lock Braking Systems (ABS). An ABS system utilizes a microprocessor to monitor wheel rotational behavior and selectively applies and relieves brake pressure in the corresponding wheel brakes in order to maintain the wheel speed within a selected slip range to achieve maximum braking force.

Electronically controlled ABS valves, comprising apply valves and dump valves, are located between the master cylinder and the wheel brakes. The ABS valves regulate the pressure between the master cylinder and the wheel brakes. Typically, when activated, these ABS valves operate in three pressure control modes: pressure apply, pressure dump and pressure hold. The apply valves allow pressurized brake fluid into respective ones of the wheel brakes to increase pressure during the apply mode, and the dump valves relieve brake fluid from their associated wheel brakes during the dump mode. Wheel brake pressure is held constant during the hold mode by closing both the apply valves and the dump valves.

A further development in braking technology has led to the introduction of Traction Control (TC) systems. Typically, valves have been added to existing ABS systems to provide a brake system which controls wheel speed during acceleration. Excessive wheel speed during vehicle acceleration leads to wheel slippage and a loss of traction. An electronic control system senses this condition and automatically applies braking pressure to the wheel cylinders of the slipping wheel to reduce the slippage and increase the traction available. In order to achieve optimal vehicle acceleration, pressurized brake fluid is made available to the wheel cylinders even if the master cylinder is not actuated by the driver. Complex brake systems may further include a Vehicle Stability Control (VSC) brake system which improves the stability of the vehicle by counteracting forces through selective brake actuation. These forces and other vehicle parameters are detected by sensors which signal an electronic control unit. The electronic control unit automatically operates pressure control devices to regulate the amount of hydraulic pressure applied to specific individual wheel brakes. In order to achieve optimal vehicle stability, braking pressures greater than the master cylinder pressure must quickly be available at all times.

The various components of the brake system described above are commonly housed in control unit assembly. The control unit assembly generally includes a hydraulic control unit including a block or housing for containing the various hydraulic components such as the master cylinder, motor, and valves. The control unit assembly further includes an electronic control unit or ECU for housing electrical components such as microprocessors and input/output connectors. The ECU typically includes a non-conducting plastic housing and is fastened to the hydraulic block. Electrical connectors are used to provide electrical communication between various components in the hydraulic block with electric circuit boards or other components in the ECU. These electrical connectors establish an electrical connection and span the distance between a circuit board of the ECU and a circuit board or component within the hydraulic control unit. Various types of electrical connectors have been used in the past. These electrical connectors are often costly to manufacture and/or difficult to assemble. It is desirable to provide an inexpensive solution for the manufacture and assembly of suitable electrical connectors.

SUMMARY OF THE INVENTION

This invention relates to an electrical connector adapted to be retained in a non-conducting housing and electrically connecting a first component to a second component spaced from one another. The connector includes a first end having a first contact portion for electrically communicating with the first component. A second end of the connector has a second contact portion for electrically communicating with the second component. The second end has a cantilevered beam adapted to flex at a knee portion to bias the second contact portion against an electrical contact surface of the second component. An attachment portion is disposed between the first and second ends. The attachment portion includes an engagement portion providing an interference fit with a mating groove of the housing in which the connector is retained.

Another aspect of the invention relates to electrical connectors for use in a control unit for a vehicle brake system. The brake system includes a housing having a plurality of bores and conduits formed therein for housing various hydraulic components and to provide fluid passageways therein. An electronic control unit includes a microprocessor having a plurality of electrical contacts. The control unit also includes an insulating body disposed in the housing and a sensor circuit board disposed adjacent to the insulating body. A plurality of electrical connectors are mounted within the insulating body for electrically connecting the sensor circuit board to the microprocessor of the electrical control unit. Each of the connectors includes a first end having a first contact portion for electrically communicating with the microprocessor, and a second end having a second contact portion for electrically communicating with the sensor circuit board. The second end has a cantilevered beam adapted to flex at a knee portion to bias the second contact portion against an electrical contact surface of the sensor circuit board. The electrical connector further includes an attachment portion disposed between the first and second ends. The attachment portion includes an engagement portion providing an interference fit with a mating groove of the insulating body in which the connector is retained.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
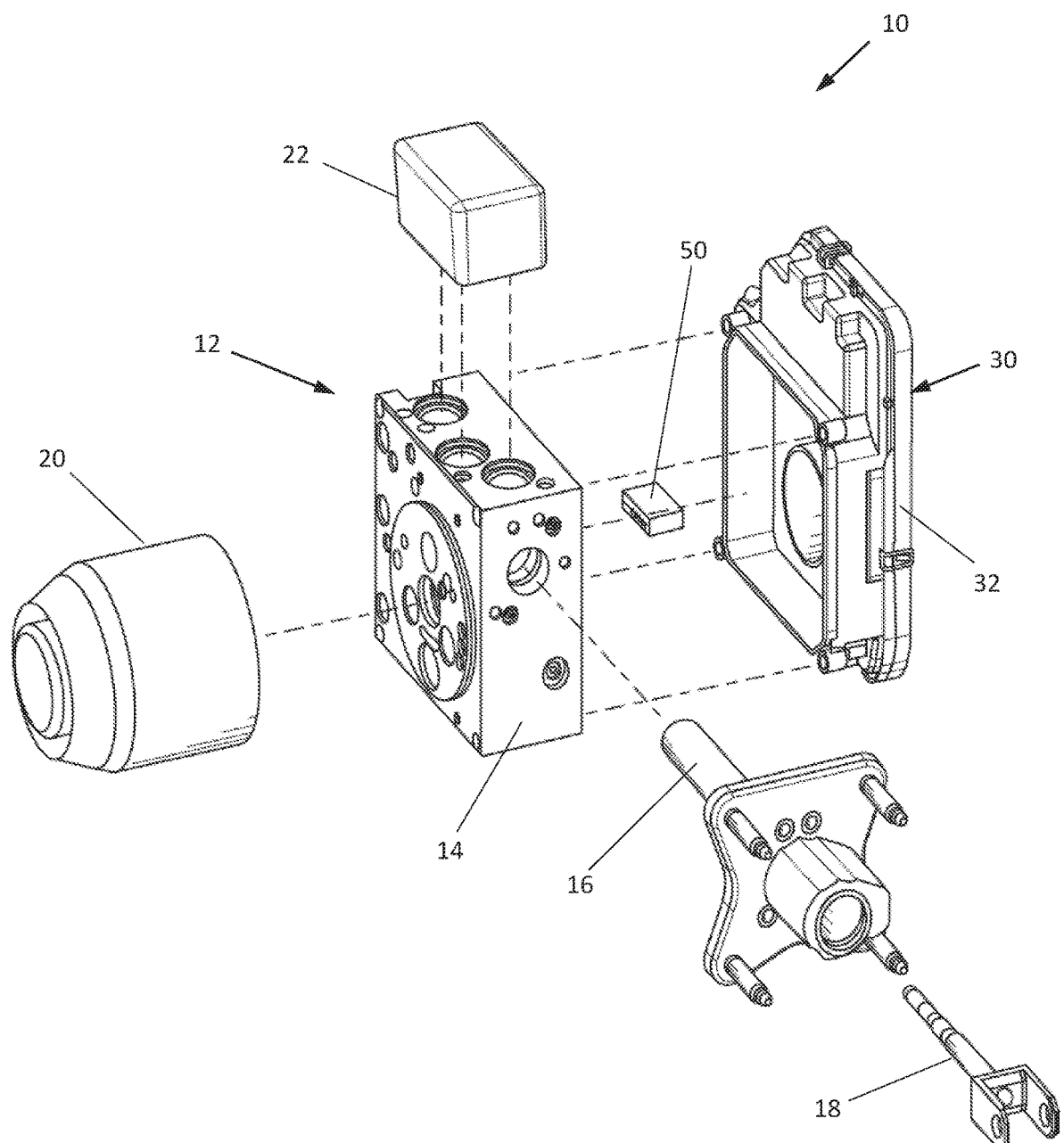
FIG. 1 is an exploded perspective view of a vehicular brake system control unit.

Referring now to the drawings, there is schematically illustrated in FIG. 1 a vehicular brake system control unit, indicated generally at 10. Various components of a vehicle brake system are housed in the control unit assembly 10. For simplicity, the control unit assembly 10 has been illustrated in a very basic schematic form. Additionally, many of the various components of the brake system housed within the control unit assembly 10 will not be shown or will only be shown in a simplistic illustrative manner.

As shown in FIG. 1, the control unit 10 includes a hydraulic control unit, indicated generally at 12. The hydraulic control unit 12 generally contains the hydraulic components of the vehicle brake system and houses them in a block or housing 14. Examples of hydraulic components include solenoid actuated valves, check valves, filters, pistons, and pump assemblies. The housing 14 may also retain various sensors (not shown), such as pressure sensors and travel sensors. The housing 14 may be made of any suitable material, such as aluminum, and can be machined to include numerous bores and cavities for housing the hydraulic components. Additionally, bores and passageways may be formed in the housing 14 to provide fluid communication paths between the various hydraulic components.

As shown in FIG. 1, the housing 14 of the hydraulic control unit may be configured to accommodate a master cylinder 16. The master cylinder 16 includes one or more pressure chambers that fluidly communicate with other hydraulic components retained within the housing 14. The master cylinder 16 is mechanically connected with a brake pedal (not shown) via a linkage 18. A motor 20 may also be connected to the housing 14. The motor 20 may be utilized for running a pump assembly (not shown) retained within the housing 14 for providing a source of pressurized fluid for the brake system. Alternatively, the motor 20 may be provided to engage a linear actuator (not shown) for operating a plunger assembly (not shown) for providing a source of pressurized fluid. A fluid reservoir 22 may further be attached to the housing 14 providing a reserve of fluid generally held at atmospheric pressure.

The control unit 10 further includes an electronic control unit (ECU), schematically shown at 30. The ECU 30 may include a housing 32 which is attached to the housing 14 of the hydraulic control unit 12. The housing 32 of the ECU 30 is preferably made of a non-conducting material, such as plastic. The housing 32 houses various electrical components of the brake system such as microprocessors, printed circuit boards, solenoids, wiring, and wire harness input/output connectors. Generally, the microprocessor of the ECU 30 receives various signals, processes signals, and controls the operation of various electrical components of the brake system in response to the received signals. The ECU 30 can be connected to various sensors such as pressure sensors, travel sensors, switches, wheel speed sensors, and steering angle sensors. The ECU 30 may also be connected to an external module (not shown) for receiving information related to yaw rate, lateral acceleration, longitudinal acceleration of the vehicle such as for controlling the brake system during vehicle stability operation. Additionally, the ECU 30 may be connected to the instrument cluster for collecting and supplying information related to warning indicators such as an ABS warning light, a brake fluid level warning light, and a traction control/vehicle stability control indicator light.

Figure 2:
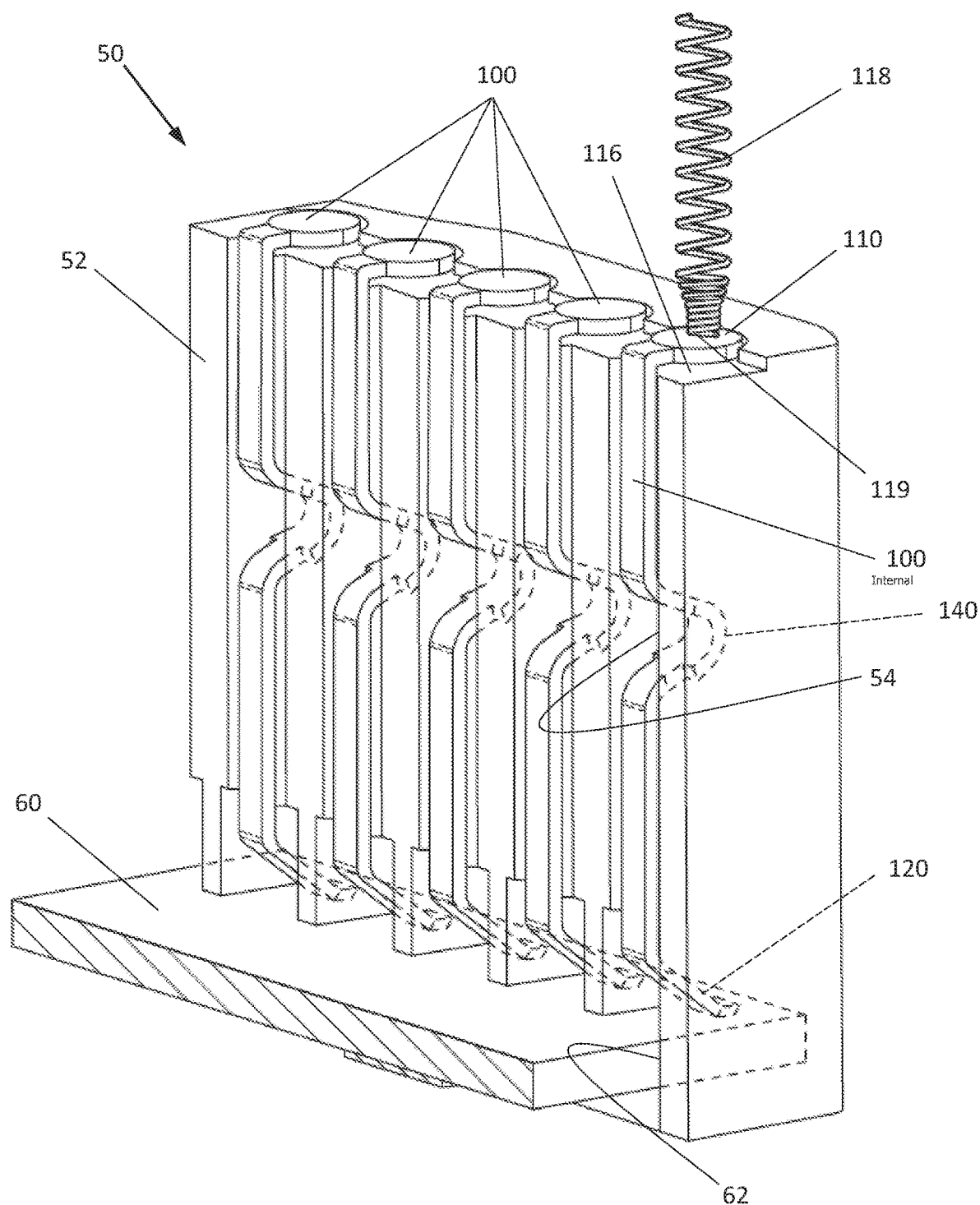
FIG. 2 is a partial cross-sectional perspective view of a connector assembly of FIG. 1.

The control unit 10 further includes a connector assembly, shown schematically at 50 in FIG. 1. A portion of the connector assembly 50 is also shown in FIG. 2. The connector assembly 50 may be housed within a cavity or compartment formed in the housing 14 of the hydraulic control unit 12. In a preferred embodiment, the connector assembly 50 may be simply inserted into a cavity or compartment of the housing 14 to install the connector assembly 50 in the housing 14. As will be discussed in detail below, the connector assembly 50 includes one or more electrical connectors 100 which provide for electrical communication between a first component housed in the ECU 30 and a second component housed in the hydraulic control unit 12. It is noted that the first and second components are spaced apart from one another. Thus, the electrical connector 100 spans the distance between electrical contact portions of the first and second components to provide electrical communication therebetween.

Referring to FIG. 2, the connector assembly 50 includes a bracket or insulating body 52. Preferably, the body 52 is made of a non-conducting material, such as plastic. In the embodiment of the connector assembly 50 shown in FIG. 2, the body 52 may be made of first and second halves that are fastened or held together after the electrical connectors 100 are installed in the connector assembly 50. Thus, only one half of the body 52 is shown in FIG. 2. Of course, the body 52 could be configured with a single piece body which retains all electrical connectors 100 of the connector assembly 50. The body 52 preferably includes a plurality of grooves 54 formed therein for retaining and positioning corresponding electrical connectors 100, as will be explained in detail below. In the illustrated embodiment of the body 52, there are five grooves 54 corresponding to the five electrical connectors 100. The connector assembly 50 may include another body half (not shown) corresponding to another set of five electrical connectors 100. The body halves can then be fastened or held together to form the connector assembly 50 having a total of ten electrical connectors 100. Of course, any suitable number of electrical connectors 100 may be used for proper electrical communication between the first and second components, as will be discussed below.

The connector assembly 50 may further include a first component, in the form of a circuit board, indicated schematically at 60. The circuit board 60 may be mounted within the body 52 such as by being disposed in a slot 62 formed in the body 52. The circuit board 60 may contain an electrical component or an electrical contact pad that provides for a physical contact point to electrically communicate with a portion of the electrical connector 100, as will be explained in detail below. For example, the circuit board 60 may include a sensor (not shown), such as a travel sensor, which senses the position of a piston as it travels within the housing 14 of the hydraulic control unit 12 in which the connector assembly 50 is also installed. The sensor of the circuit board 60 uses an electrical connector 100 to electrically communicate with components within the ECU 30. The corresponding electrical connector 100 may be configured to transmit electrical power therethrough, or may transmit information or data such as to a microprocessor within the ECU 30.

One example of a suitable sensor for use in the connector assembly 50 is a travel sensor in the form of a Hall effect sensor array. The circuit board 60 may include one or more Hall effect sensors (not shown) mounted thereon. Magnetic elements could then be attached to one or more movable pistons mounted in the housing 14 of the hydraulic control unit 12, such as pistons of the master cylinder 16. Alternatively, the magnetic elements could be mounted to a separate arm that moves in conjunction with the pistons. The positional movement of the pistons of the master cylinder 16 can then be detected by the Hall effect sensor array by the positional changes of the magnetic field generated by the magnetic elements as sensed by the Hall effect sensors. The housing 14 of the hydraulic control unit 12 could be configured such that the connector assembly 50 is positioned within the housing 14 adjacent to the pistons of the master cylinder 16. As stated above, the body 52 of the connector assembly 50 could be positioned within a cavity or compartment formed in the housing 14.

Figure 3:
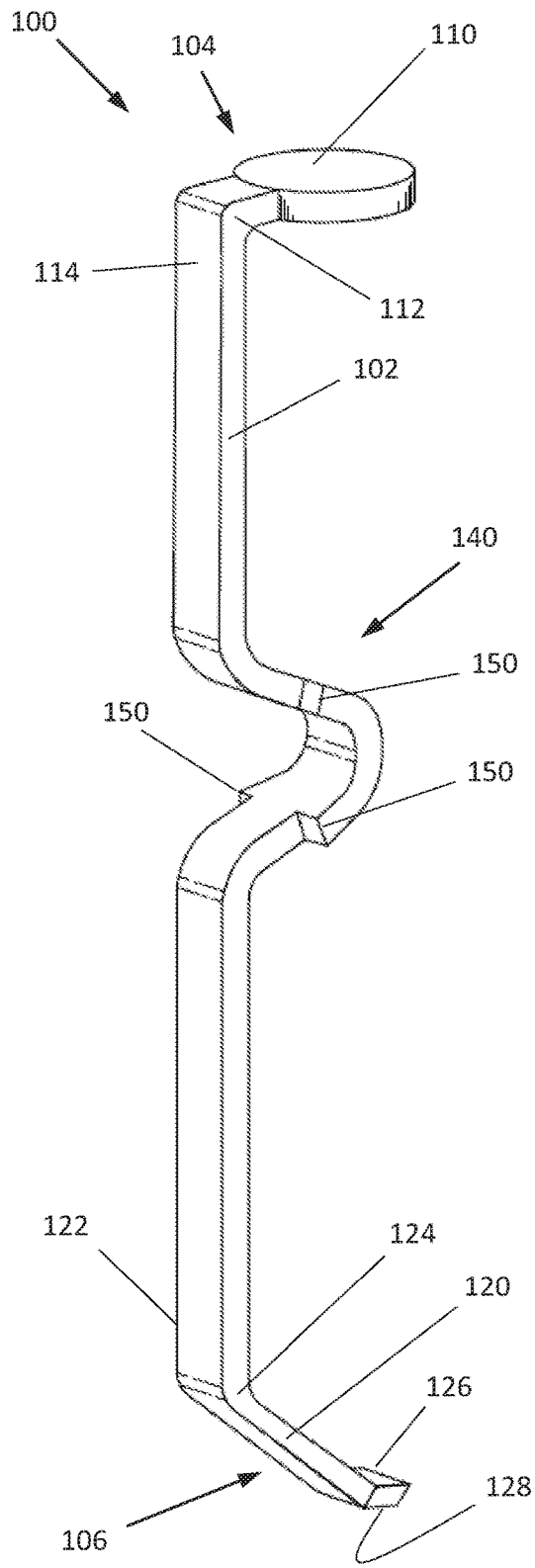
FIG. 3 is a front perspective view of an electrical connector used in the connector assembly of FIG. 2.
Figure 4:
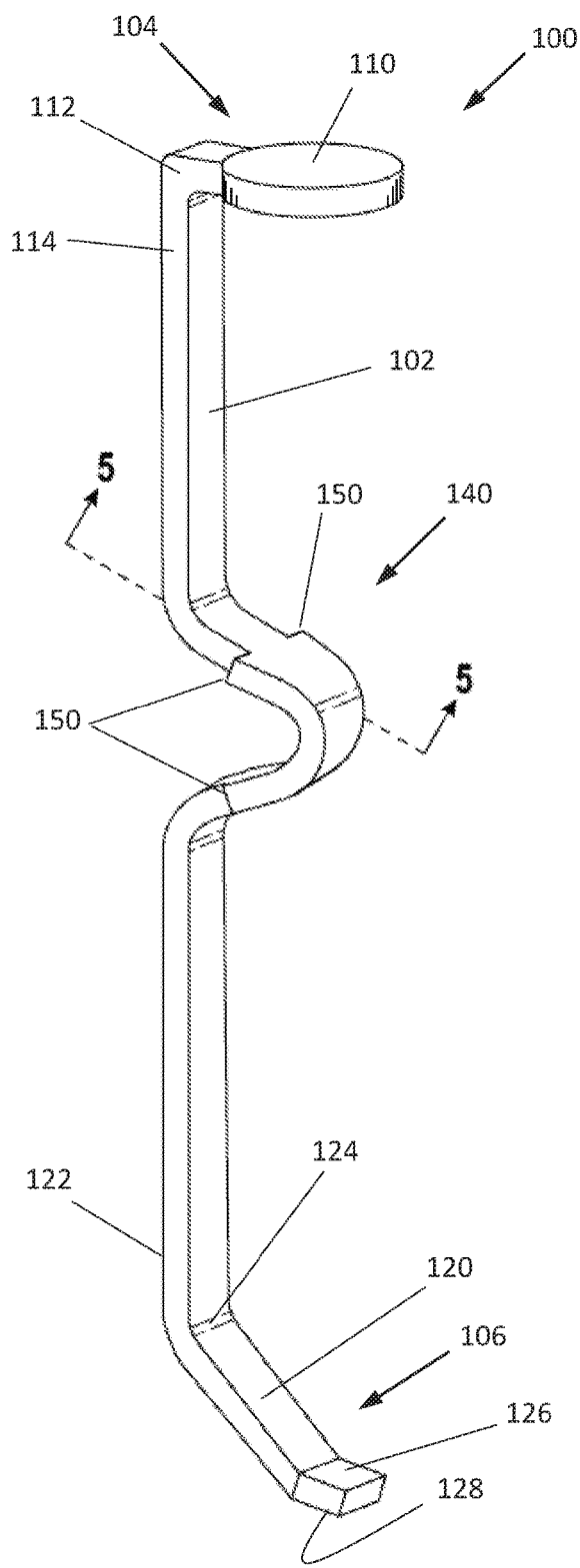
FIG. 4 is a side perspective view of the electrical connector of FIG. 3.
Figure 7:
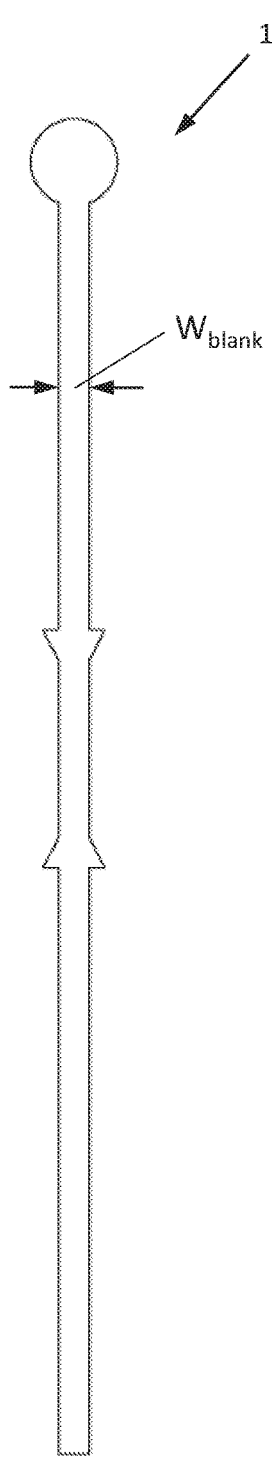
FIG. 7 is a plan view of a blank that is used to form the electrical connector of FIGS. 3 and 4.

The structural details of the electrical connectors 100 will now be described. Although all of the electrical connectors 100 illustrated in FIG. 2 are essentially identical, it should be understood that the various electrical connectors 100 may have different configurations. FIGS. 3 and 4 illustrate an embodiment of an electrical connector 100 shown outside of the body 52. The electrical connector 100 is preferably formed from a single blank 101 as shown in FIG. 7. The blank 101 may have a constant thickness and stamped and formed from a sheet of conductive material, such as metal. It should be understood that any suitably conductive material can be used to form the blank 101. The blank 101 may have a generally uniform width $W_{blank}$ with the exception of the portions forming the contact pad 110 and the attachment portion 140, as will be explained below.

Referring back to FIGS. 3 and 4, the electrical connector 100 generally includes an elongated body 102 extending between a first or upper end, indicated generally at 104, and a second or lower end, indicated generally at 106. Please note that the terms "upper" and "lower" are merely used for descriptive purposes and are not meant to be limiting as to the orientation of the electrical connector 100 within the body 52 or the housing 14.

The upper end 104 includes a circular shaped contact pad 110 generally extending at a right angle relative to the elongated body 102. A generally 90-degree curved joining portion 112 connects the contact pad 110 to an upper portion 114 at the upper end 104 of the body 102. The curved joining portion 112 may be formed by bending or forming the blank 101 to position the circular contact pad 110 at a generally right angle with respect to the elongated body 102. Note that in the illustrated embodiment, the circular contact pad 110 has a width or diameter which is greater than the width $W_b$ of the elongated body 102. If desired, the contact pad 110 may have the same width, a smaller width, or be shaped differently than what is shown in FIGS. 2 through 5. As shown in FIG. 2, the contact pad 110 may simply rest on an upper surface 116 of the body 52. Alternatively, the contact pad 110 could be disposed in a pocket (not shown) formed in the upper surface 116 of the body 52 to help retain the contact pad 110 relative to the body 52.

When the control unit 10 is assembled and the connector assembly 50 is installed into the housing 14 of the hydraulic control unit 12, the contact pad 110 will be in contact with a conducting member to provide an electrical connection with a component of the ECU 30, such as for example a circuit board (not shown) housed within the ECU 30. An example of a suitable intermediate conducting member is a coil spring 118, as shown in FIG. 2. The coil spring 118 has a bottom end 119 that directly contacts and electrically communicates with the contact pad 110 of the electrical connector 100. The upper end of the coil spring 118 can be electrically connected to the corresponding circuit board of the ECU 30. The width or diameter of the contact pad 110 may be configured sufficiently large to assure contact with the bottom end 119 of the coil spring 118 during assembly of the control unit 10 accommodating any manufacturing or assembly tolerances or dimensionally discrepancies.

Referring back to FIGS. 3 and 4, the lower end 106 of the electrical connector 100 includes a beam 120 extending at an angle from a lower portion 122 at the lower end 106 of the body 102. The beam 120 extends from the lower portion 122 at a bend point or knee 124. The knee 124 can be formed by simply bending or forming the blank 101 to position the beam 120 in a cantilevered angled manner from the body 102 at the knee 124. The beam 124 may optionally end in a tab or foot portion 126 to provide a relatively large contact area with a corresponding contact area formed on the circuit board 60. Upon proper placement of the electrical connector 100 on the body 52 and upon proper assembly of the control unit 10, a rectangular bottom contact surface 128 of the foot portion 126 preferably is co-planar and adjacent to the contact surface of the circuit board 60. The rectangular bottom contact surface 128 of the foot portion 126 provides a much greater electrical contact area than a single point contact or line contact if the tip of the beam 124 simply rested on the contact surface of the circuit board 60.

The cantilevered arrangement of the beam 124 enables the beam 124 to function as a spring member in that the beam 124 can flex at the knee 124. Preferably, the electrical connector 100 is designed such that a biasing force forces the bottom portion 128 of the foot portion 126 against the contact surface of the circuit board 60 providing a constant contact load. Thus, when installed, the angle of the beam 124 relative to the elongated body 102 is different from the angle of the beam 124 relative to the elongated body 102 in its relaxed state. This biasing force helps to maintain a good electrical connection between the electrical connector 100 and the circuit board 60 and helps to eliminate the need for additional locking, contacting, or welding features at the location of the electrical contact. The flex of this spring biasing feature will permit contact with the circuit board 60 independent of dimensional variations affecting the precision of the interfacing electrically conductive surface of the circuit board 60.

The electrical connector 100 further includes an attachment portion, indicated generally at 140. The attachment portion 140 provides for an economical and quick means for attaching and properly positioning the electrical connector 100 to the body 52 of the connector assembly 50. The attachment portion 140 can be located at any suitable location along the elongated body 102. Preferably, the attachment portion 140 is located in an intermediate position between the upper and lower ends 104 and 106 of the electrical connector 100. It should be understood that the attachment portion 140 can have other structural features than what is shown and described herein. In the embodiment illustrated in FIGS. 2 through 4, the attachment portion 140 has a generally U-shaped configuration extending laterally outwardly from the elongated body 102. This U-shaped configuration can be easily formed by simply bending, stamping or otherwise forming the blank 101 into such a shape.

The U-shaped attachment portion 140 is configured to extend into a corresponding mating hole, cavity or the groove 54 of the body 52 to secure the electrical connector 100 to the body 52. The groove 54 can be any suitably shaped hole, pocket or cavity for receiving the attachment portion 140. In a preferred embodiment, the U-shaped attachment portion 140 is retained in the groove 54 by an interference fit coupling arrangement. For example, an interference fit may be defined as a fit between two parts in which the external dimension of one part slightly exceeds the internal dimension of the part into which it has to fit. A frictional mechanical attachment can thus be made between the electrical connector 100 and the body 52 simply by inserting the attachment portion 140 into the groove 54 formed in the body 52. With respect to the electrical connector 100, the width of the attachment portion 140 (or a portion of the attachment portion 140) may be slightly greater than the width of the groove 54 of the body 52.

Figure 5:
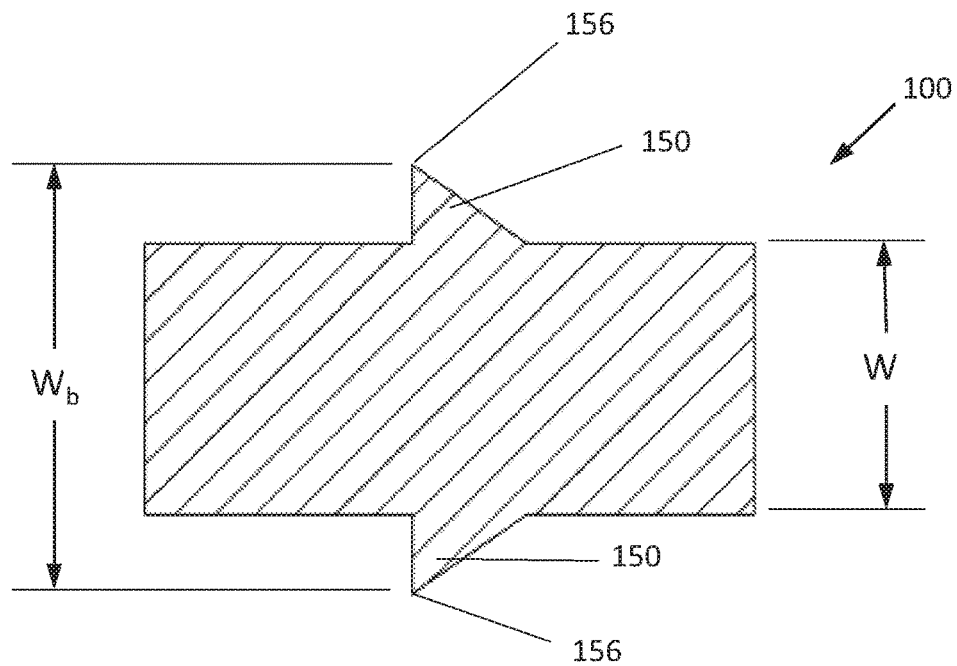
FIG. 5 is a cross-sectional view of the electrical connector taken along lines 5-5 in FIG. 4.

In a preferred embodiment, the attachment portion 140 includes one or more barbs 150 extending slightly outwardly from a side edge 152 of the attachment portion 140, as is shown in the cross-sectional view of FIG. 5. It is noted that the dimensions of the barbs 150 are shown in all of the Figures by an exaggerated degree for visual clarity and descriptive purposes and are not necessarily drawn to scale. The barbs 150 essentially form a sharp projection angled away from the side edge 152 so as to make extraction of the attachment portion 140 from the groove 54 relatively difficult. The barbs 150 generally define an engagement portion of the connector 100 to provide the interference fit with the mating groove 54 of the body 52 in which the connector 100 is retained. During insertion of the barbs 150 into the corresponding groove 54, slight deformation of the electrical connector 100 and/or the body 52 may occur to accommodate this interference fit. The attachment portion 140 may include any suitable number of barbs. In the embodiment of the electrical connector 100 shown in FIGS. 2 through 4, the attachment portion 140 includes two pairs of barbs 150, wherein one pair is formed on one portion or leg of the U-shaped attachment portion 140, and the other pair is formed on the other portion or leg of the U-shaped attachment portion 140.

Referring to FIG. 5, a width $W_b$ is measured from the outer tip 156 of one barb 150 to the outer tip 156 of the opposed barb 150. The width $W_b$ is preferably slightly greater than the width of the groove 54 into which the attachment portion 140 is inserted to provide the interference fit coupling. It should also be understood that the attachment portion 140 may be configured without barbs 150 such that the width W of the attachment portion 140 is slightly larger than the width of the groove 54. If desired, the width W along the entire length of the elongated body 102 of the electrical connector 100 may be slightly larger than the width of the groove 54. Thus, the elongated body 102 may define an engagement portion which provides for the interference fit. The groove 54 may be formed at any suitable location on the body 52.

Figure 6:
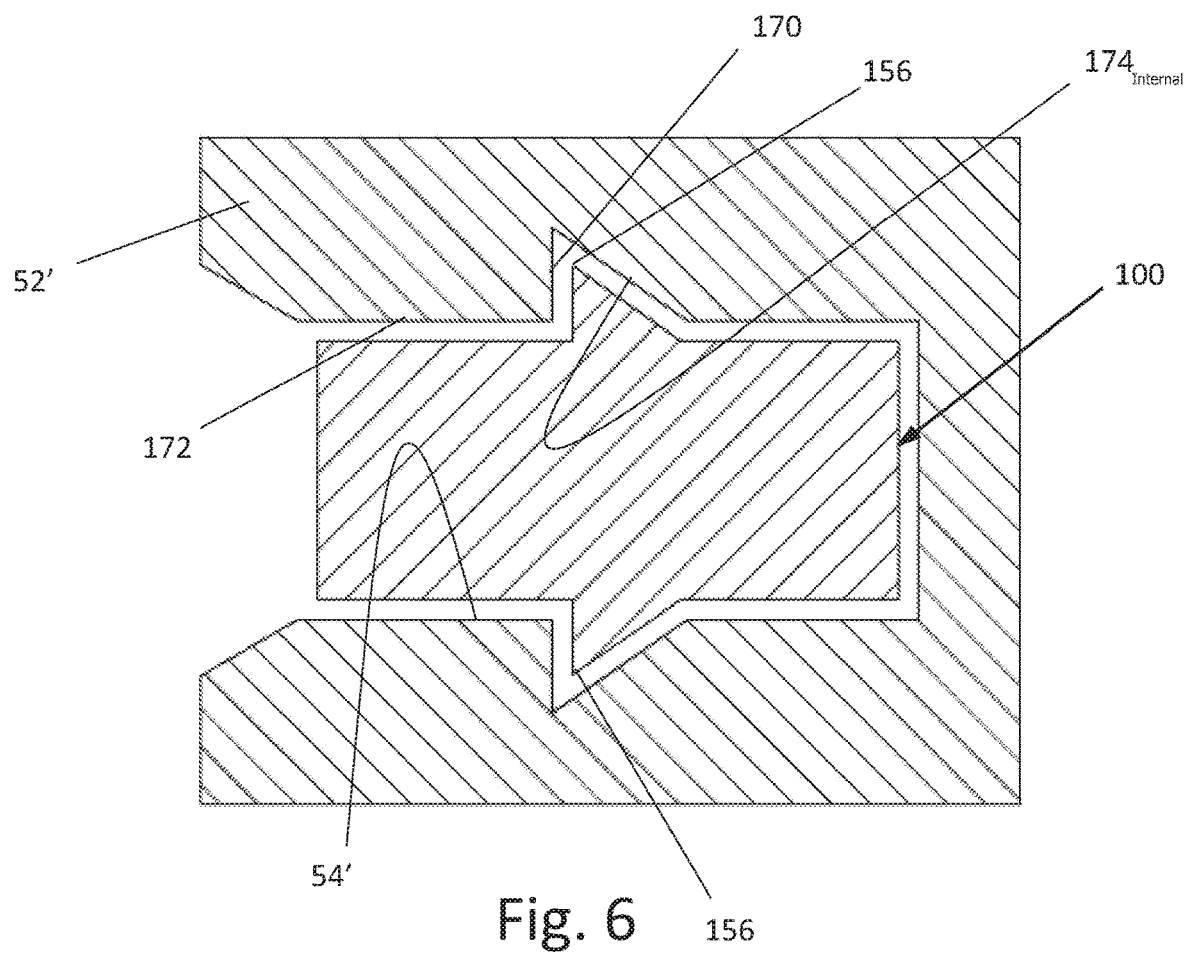
FIG. 6 is a cross-sectional view of an alternate embodiment illustrating a different attachment configuration of the electrical connector to the body of the connector assembly.

FIG. 6 illustrates another alternate embodiment of a body 52' having a groove 54' formed therein which has a stepped or grooved arrangement forming shoulders 170 formed between a narrow portion 172 and an enlarged portion 174 of the groove 54'. The width of the narrow portion 172 is slightly less than the width of the enlarged portion 174. In this embodiment, as the attachment portion 140 is inserted into the groove 54' (in the rightward direction as viewing FIG. 6), the barbs 150 will resiliently snap into place adjacent the shoulders 170 once the tips 156 of the barbs 150 are moved past the shoulders 170. The locking arrangement between the barbs 150 and the shoulders 170 prevents the attachment portion 140 from moving leftward out of the groove 54'. It should also be noted that the enlarged portion 174 may not formed in a sloped manner as shown in FIG. 6 but could be configured to extend rightwardly towards the bottom of the groove 54'.

Figure 8:
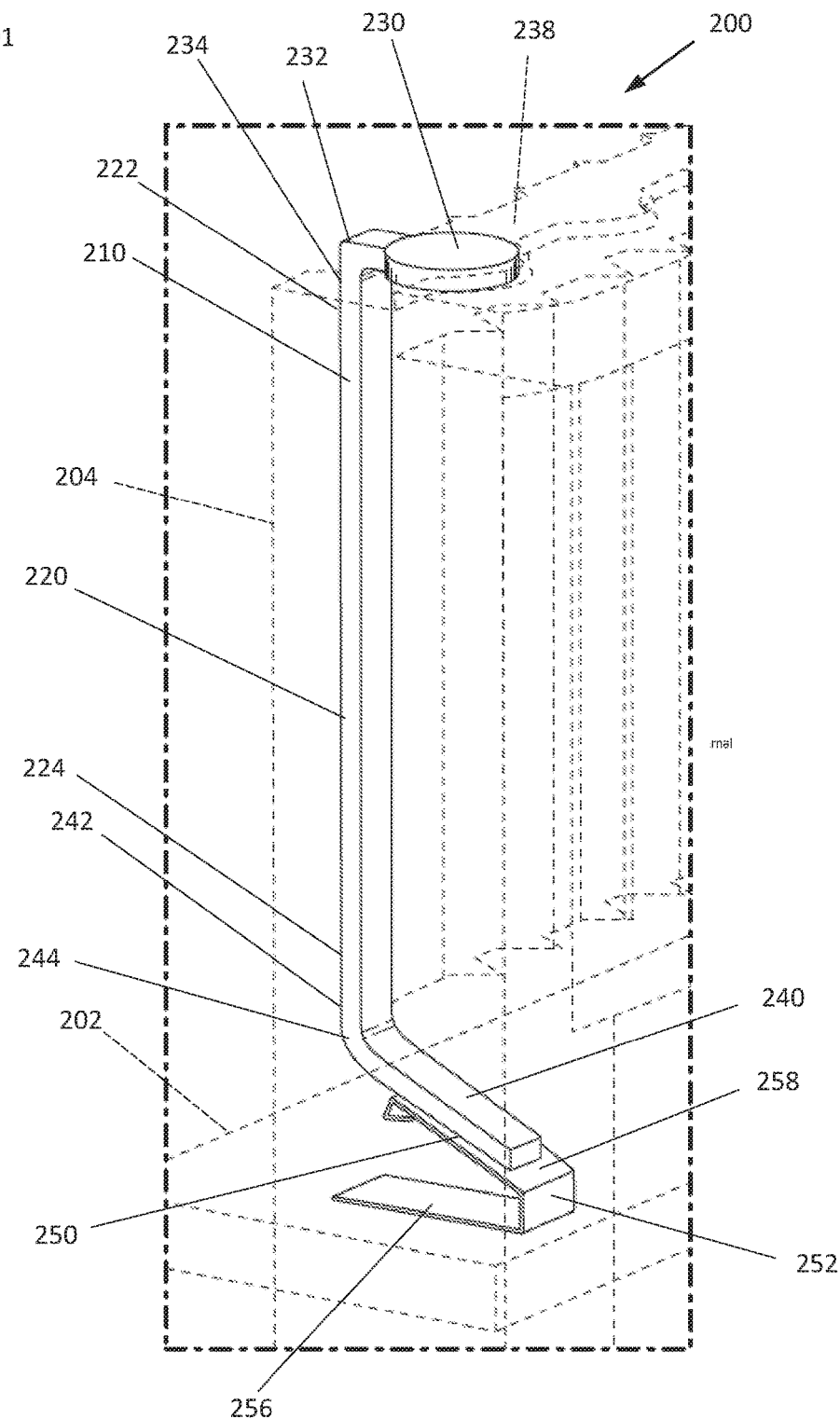
FIG. 8 is a partial cross-sectional perspective view of an alternate embodiment of a connector assembly and an electrical connector.

There is illustrated in FIG. 8 an alternate embodiment of a portion of a connector assembly, indicated generally at 200. The structure and function of the connector assembly 200 may be similar to the connector assembly 50 described above. The connector assembly 200 includes a circuit board 202 housed within a non-conducting body 204. An electrical connector 210 is retained in the body 204. Of course, the connector assembly 200 may include a plurality of electrical connectors 210. The electrical connector 210 electrically communicates with the circuit board 202, as will be explained below.

The electrical connector 210 may be formed from a single metallic blank (not shown) having a constant thickness in a similar manner as the electrical connector 100 described above. The electrical connector 210 includes an elongated body 220 extending between a first upper end, indicated generally at 222, and a second or lower end, indicated generally at 224. The upper end 222 includes a circular shaped contact pad 230 generally extending at a right angle relative to the elongated body 220. A generally 90-degree curved joining portion 232 connects the contact pad 230 to an upper portion 234 at an upper end 222 of the body 220. The circular contact pad 230 may have a width which is greater than the width of the elongated body 220. As shown in FIG. 8, the contact pad 230 may simply rest on an upper surface 238 of the body 204.

The lower end 224 of the electrical connector 210 includes a beam 240 extending at an angle from a lower portion 242 at the lower end 224 of the body 220 at a knee 244. A bottom surface 250 of the beam 240 contacts and electrically communicates with a spring contact member 252 mounted on the circuit board 202. The spring contact member 252 may be formed from a metallic blank (not shown). The spring contact member 252 has a lower portion 256 which is attached to an appropriate electrical contact member of the circuit board 202 to which the electrical connector 210 is electrically connected to. An upper portion 258 of the spring contact member 210 contacts the bottom surface 250 of the beam 240 of the electrical connector 210. The spring contact member 252 and/or the beam 240 may impose a biasing spring force against one another to maintain a contact load.

Note that the electrical connector 210 lacks an intermediate attachment portion such as the attachment portion 140 of the electrical connector 100 described above. Instead, the elongated body 220 of the electrical connector 210 itself may be retained to the body 204 by an interference fit. Alternatively, the electrical connector 210 may be adhesively retained to the body 204.

The principle and mode of operation of this invention have been explained and illustrated in its preferred embodiment. However, it must be understood that this invention may be practiced otherwise than as specifically explained and illustrated without departing from its spirit or scope.

What is claimed is:

1. An electrical connector adapted to be retained in a non-conducting housing and electrically connecting a first component to a second component spaced from one another, the connector including:
    an elongated body portion including opposing first and second longitudinally extending portions;
    a first end adjacent the first longitudinally extending portion, the first end having a first contact portion for electrically communicating with the first component;
    a second end adjacent the second longitudinally extending portion, the second end having a second contact portion for electrically communicating with the second component, wherein the second end has a cantilevered beam adapted to flex at a knee portion to bias the second contact portion against an electrical contact surface of the second component; and
    a U-shaped attachment portion on the elongated body portion disposed between the first and second ends, the U-shaped attachment portion being between and extending laterally outward from the first and second longitudinally extending portions, at least one barb extending outwardly from the U-shaped attachment portion to provide an interference fit with a mating groove of the housing in which the connector is retained.

2. The connector of claim 1, wherein the elongated body portion has a generally constant width.

3. The connector of claim 1, wherein the first end is formed into a contact pad having a width greater than the width of the elongated body portion, the contact pad being formed at approximately a right angle relative to the elongated body.

4. The connector of claim 1, wherein the connector is made of a single electrically conducting material formed from an elongated single blank, and wherein the first end, the second end, and the attachment portion are formed by bending the single blank.

5. The connector of claim 1, wherein the foot portion extends outwardly from the cantilevered portion at an angle thereto adapted so that the flat contact surface is to be in parallel alignment with the electrical contact surface of the second component.

6. An electrical connector adapted to be retained in a non-conducting housing and electrically connecting a first component to a second component spaced from one another, the connector including:
    an elongated body portion including opposing first and second longitudinally extending portions;
    a first end adjacent the first longitudinally extending portion, the first end having a contact pad having a width greater than the width of the elongated body portion, wherein the contact pad is adapted for electrically communicating with the first component;
    a second end adjacent the second longitudinally extending portion, the second end having a second contact portion for electrically communicating with the second component, wherein the second end has a cantilevered beam adapted to flex at a knee portion to bias the second contact portion against an electrical contact surface of the second component; and
    an U-shaped attachment portion on the elongated body portion disposed between the first and second ends, the U-shaped attachment portion being between and extending laterally outward from the first and second longitudinally extending portions, at least one barb extending outwardly from the U-shaped attachment portion to provide an interference fit with a mating groove of the housing in which the connector is retained.

7. The connector of claim 6, wherein the connector is made of a single electrically conducting material formed from an elongated single blank, and wherein the first end, the second end, and the attachment portion are formed by bending the single blank.

8. A control unit for a vehicle brake system including:
    a housing having a plurality of bores and conduits formed therein for housing various hydraulic components and to provide fluid passageways therein;
    an electronic control unit having an ECU housing that is separate from and attached to the housing, the ECU housing including a microprocessor having a plurality of electrical contacts;
    an insulating body disposed in the housing;
    a sensor circuit board disposed adjacent to the insulating body;
    a plurality of electrical connectors mounted within the insulating body for electrically connecting the sensor circuit board to the microprocessor of the electrical control unit, wherein each of the connectors includes:
        a first end having a first contact portion for electrically communicating with the microprocessor;
        a second end having a second contact portion for electrically communicating with the sensor circuit board, wherein the second end has a cantilevered beam adapted to flex at a knee portion to bias the second contact portion against an electrical contact surface of the sensor circuit board; and
        an attachment portion disposed between the first and second ends, the attachment portion including an engagement portion providing an interference fit with a mating groove of the insulating body in which the connector is retained.

9. The control unit of claim 8, wherein the sensor circuit board is disposed within the insulating body.

10. The control unit of claim 8, wherein the engagement portion is defined by a barb extending outwardly from the body portion to provide the interference fit with the mating groove of the insulating body.

11. The control unit of claim 8, wherein the first end is formed into a contact pad having a width greater than the width of the elongated body portion.

12. The control unit of claim 8, wherein the attachment portion is U-shaped and extends laterally outwardly from the elongated body such that the U-shaped attachment portion is adapted to extend into the mating groove of the insulating body.

13. The control unit of claim 12, wherein the U-shaped attachment portion includes at least one outwardly extending barb to provide the interference fit with the mating groove of the insulating body.

\* \* \* \* \*